United States Patent [19]

Austin

[11] 4,165,433
[45] Aug. 21, 1979

[54] METHOD FOR CONVERTING DEXTRO TO LEVO ROTATORY CHITIN

[75] Inventor: Paul R. Austin, Wilmington, Del.

[73] Assignee: University of Delaware, Newark, Del.

[21] Appl. No.: 834,938

[22] Filed: Sep. 20, 1977

Related U.S. Application Data

[60] Division of Ser. No. 728,257, Sep. 30, 1976, Pat. No. 4,059,457, which is a continuation-in-part of Ser. No. 659,280, Feb. 19, 1976, Pat. No. 4,062,921.

[51] Int. Cl.² .............................................. C09J 3/04
[52] U.S. Cl. ...................................... 536/20; 106/203; 424/180
[58] Field of Search ................. 106/203; 260/32.8 N; 536/20; 424/180; 264/186, 204, 217, 218, 207

[56] References Cited

U.S. PATENT DOCUMENTS

| | | | |
|---|---|---|---|
| 3,989,535 | 11/1976 | Capozza | 106/203 |
| 4,029,727 | 6/1977 | Austin et al. | 264/186 |
| 4,062,921 | 12/1977 | Austin | 264/186 |

Primary Examiner—Lorenzo B. Hayes
Attorney, Agent, or Firm—John J. McDonnell

[57] ABSTRACT

Method for converting dextro rotatory chitin to levo rotatory chitin comprising dissolving chitin in a composition containing dimethyl acetamide, N-methyl-pyrrolidone or mixture thereof and lithium chloride.

1 Claim, No Drawings ial rotation. The solvents of this invention offer a mild means of treatment that can often return the chitin to its original levo form.

METHOD FOR CONVERTING DEXTRO TO LEVO ROTATORY CHITIN

The Government of the United States has rights in this invention pursuant to Grant No. 04-3-158-30 with the Department of Commerce.

BACKGROUND OF THE INVENTION

This is a division of application Ser. No. 728,257, filed Sept. 30, 1976, now U.S. Pat. No. 4,059,457, issued Nov. 22, 1977, which in turn is a continuation in part of U.S. Application Ser. No. 659,280 filed Feb. 19, 1976, now U.S. Pat. No. 4,062,921 issued Dec. 13, 1977, by Paul R. Austin.

This invention relates to new solvents for chitin and their use in the purification of chitin.

Chitin is an aminocellulose derivative that ocurs widely in nature, for example, in the cell walls of fungi, bovine cartilage, cuttlefish bone and the hard shell of insects and crustaceans. The waste from shrimp, lobster and crab seafood industries contains 10–14% chitin and is a potentially important source of chitin. The isolation and purification of the chitin, associated in such waste with mineral components, protein and other ingredients, presents considerable difficulty and may cause hydrolytic degradation, denaturing or change in its natural conformation and optical activity.

The applications for chitin are not extensive, in part because it has been little investigated and in part because it is difficult to purify. The use of chitin for accelerating and promoting wound healing is described in U.S. Pat. No. 3,632,754, to L. L. Balassa, Jan. 4, 1972. In other literature, the difficulties of purification are mentioned frequently. Chitin is also employed in the manufacture of chitosan, a deacetylated chitin that is readily soluble in dilute acids and may find application in paper making and surface active agents, for example.

More specifically, chitin is a mucopolysaccharide, believed to be poly-N-acetyl-D-glucosamine, with an empirical formula of $(C_8H_{13}O_5N)_n$ in which n may be any number into the thousands range, but is commonly in the area of 100–10,000. Chitin is a generally intractable material, soluble only in strong mineral acids, lithium thiocyanate solutions, and other special concentrated salt solutions, most of which cause disintegration or rapid degradation with loss in molecular weight or hydrolysis of the acetyl groups or both. Chitin is insoluble in dilute acetic acid.

More recently some new solvents for chitin are described by Paul R. Austin in U.S. Pat. No. 3,879,377, Apr. 22, 1975, and in U.S. Pat. No. 3,892,731, July 1, 1975. These solvents comprise a 1,2-chloroalcohol in admixture with an acidic solvent, e.g. sulfuric acid, and a chloracetic acid alone or in combination with other solvents, e.g. formic acid. These solvents provide useful means for purifying chitin and for regenerating the chitin in the form of films, fibers and the like. However, these solutions of chitin are not as stable as desired for storage for considerable lengths of time.

In the isolation and utilization of chitin it is desirable to set specifications for the chitin material, for example, molecular weight, viscosity or optical activity. All of these properties require a stable non-degrading solvent for their determination; the solvents of the prior art give transient values that are difficult to duplicate because of continuing chitin degradation.

It is an object of this invention to provide a new class of solvents for chitin.

It is a further object to provide a method for preparing viscosity-stable solutions of chitin that can be filtered, otherwise purified, processed, or their properties measured.

It is still another object to provide solutions of chitin from which the chitin can be regenerated in the form of films, fibers or other shaped objects.

It is a further object to provide chitin solutions that are free from hydrolytic degradation on storage for considerable periods of time, and that are able to convert certain dextrorotatory chitins to a natural levorotatory form.

SUMMARY OF THE INVENTION

It has now been found that chitin is dissolved by dimethylacetaminde, N-methylpyrrolidone or mixtures of these amides in conjunction with a minor amount, e.g. 2% up to the saturation point, of lithium chloride, at room temperature or on moderate heating, e.g. at 50° C. Solutions containing up to 15% chitin are readily obtained, depending to some extent on the molecular weight of the chitin. Solvency is limited by viscosity of the solution; the lower molecular weight chitins in general dissolve more readily and give lower viscosity systems. At higher concentrations of chitin, in the 10–15% range, an organisol system, plastic in character, is obtained. The chitin solutions can be purified by centrifuging, vacuum or pressure filtration, or other means as appropriate for the consistency of the solution and application involved.

For physical property determination and chitin characterization, dilute solutions of 1% or less of chitin are usually employed. For film and filament preparation by wet-casting and spinning technology, a solution containing 2–5% chitin is preferred and the shaped films or fibers are subsequently coagulated or renatured by treatment with excess ketone or alcohol non-solvent for chitin such as acetone, methylethyl ketone, methanol, ethanol, a propanol or a butanol, for example, washed with water and dried at ambient or elevated temperature. The resulting films and fibers are pliable and strong and can be cold drawn to orient them and to improve their strength.

At higher concentrations of chitin, in the range of 5–15%, the solutions become very viscous, approaching a plastic consistency. They are handled best by heavy duty mixers, pressure filtration and other organisol techniques. Films may be prepared by calendering or doctoring onto a moving belt, followed by solvent evaporation, water extraction and drying. Filaments may be extruded and renatured either by dry spinning with solvent evaporation or by a non-solvent precipitation as customary in wet spinning. Processing is completed as previously described.

As indicated above the dimethylacetaminde and N-methylpyrrolidone can be used along or in mixtures of any proportions in combination with the lithium chloride. Proportions of lithium chloride ranging from 2–5% by weight of the tertiary amide solvent are preferred.

An important advantage of the chitin solutions of this invention is their improved stability to degradation on storage. They have a working life of at least one month at room temperature.

Natural chitin is known to be a beta glycoside with a levo (−) optical rotation; however, the method of isolation, which may involve strong acid, alkali or heat treatments often denatures it with a consequent shift in optical rotation to a dextro (+) value. Another advantage of the chitin solutions of this invention is their ability to convert the chitin therein from such denatured, dextrorotatory form to the natural levorotatory structure during storage. This reconversion of the molecular structure or conformation of chitin to the natural beta-glycoside form is believed to be of considerable importance in the use of chitin in wound healing acceleration and other physiological properties, and in its conversion to strong continuous films and filaments.

By way of explanation, but without limitation to the scope of the invention, it may be pointed out that the optical activity of chitin was investigated by J. C. Irvine long ago (J. Chem. Soc., 95, 564(1909)). He found that a chitin sample with a specific rotation, $[\alpha]_D^{25}$, of $-14°$ in hydrochloric acid, on standing slowly hydrolyzed at the glycoside linkages to glucosamine hydrochloride with a specific rotation $[\alpha]_D^{25}$, of $+56°$. He suggested this test as a means of identifying chitin, but hydrolytic cleavage of the chitin molecular chain precluded its general acceptability. Thus the new solvent systems of the subject application at once provided a much improved tool for the characterization of chitin.

The asymmetry and hence the optical activity of polymer molecules may arise in several ways, but those most pertinent to the behavior of chitin appear to be the chirality of the carbon atoms, particularly those created by formation of the glycoside linkages, and the helical conformation of the polymer molecule as a whole (Morrison, R. T., Organic Chemistry, pp.123, 1095, et. seq., Allyn and Bacon, Boston, 1975; Lehninger, A. L., Biochemistry, p. 113 et. seq., Worth Publishers, New York, (1970). Depending upon conditions of treatment or its environment, a polymer molecule may display these characteristics independently or together in an additive fashion. In each of these cases, respectively, optical activity may be changed by inversion of some of the chiral carbon atoms (Morrison, p. 462), or by unwinding of the helix to form a random coil (Lehninger, p. 113), for example as the result of acid treatments, or other denaturing agencies such as heat. The behavior of a series of chitins from various sources and preparational histories is illustrated in Table 1.

Table 1.

| Chitin | Optical Activity of Chitins | |
|---|---|---|
|  | Initial $[\alpha]_D^{25}$ | $[\alpha]_D^{25}$ after 2 weeks |
| Horseshoe crab | $-56°$ | $-56°$ |
| Blue crab | $+33$ | $-52$ |
| Red crab | $+23$ | $-22$ |
| Pink shrimp | $+75$ | $-54$ |
| Brown shrimp | $-36$ | $-36$ |

The horseshoe crab chitin was isolated under very mild conditions, without acid treatment as the horseshoe crab is not calcified, and the brown shrimp chitin sample was prepared with acid and alkali treatments close to neutrality; the other samples were isolated with more severe treatments of acid, alkali and heat.

Suprisingly, it was found that the solvent systems of this invention not only dissolved the chitin, but at the same time provided an environment for reversal of at least a portion of the optical activity. This is a quite unusual phenomenon, encountered only occasionally in polymer chemistry; most examples are in the highly polar protein and polyaminoacid field. No examples have been found in the cellulose area. Referring again to Table 1, column three, $[\alpha]_D^{25}$ after two weeks, it is seen that blue crab and pink shrimp chitins revert to their natural chitin levo rotation, while red crab chitin only partially reverts. Brown shrimp and the horseshoe crab chitins are unchanged. A possible explanation of this behavior is that the helical conformation of the chitin molecules can be reformed from random coils by the solvents of the subject application, whereas the inversion of the glycosidic linkages of the polymer chain cannot. Thus a partially inverted and random coil chitin sample such as the red crab sample can be converted to the helical form, but the chiral carbon atoms of the glycoside linkages are unaffected. Similarly the rotations of the horseshoe crab and brown shrimp chitins are unchanged by the subject solvent system environment. A further indication of this differential behavior is the observation that a sample of the alpha-ethylglycoside of N-acetyl-glucosamine was unchanged in optical rotation on standing one week in dimethylacetamide-5% LiCl; the $[\alpha]_D^{25}$ of the sample was $+135°$ in both cases.

Chitin from various sources can be used with the solvents of this invention. Thus, chitin from red, blue, rock, king and Dungeness crabs, from lobsters, shrimp, and other crustaceans, and from the cell walls of fungi and the hard shells of insects are all operable.

The following examples illustrate in further detail the solvents of this invention and their use in the preparation of chitin films and fibers.

EXAMPLE 1

To a solution of one part of lithium chloride in 20 parts of dimethylacetamide is added 0.6 parts of chitin (red crab) and the mixture stirred at room temperature for one hour. Then 20 parts of N-methylpyrrolidone is added and the mixture stirred for two hours. The resulting solution is filtered through felt and the filtrate spread on a glass plate at a thickness of 1 mm. The wet film is dried for one hour in a current of air at room temperature, and then placed in excess acetone for 16 hours to extract solvent from the film. The film is extracted for another 24 hours with fresh acetone, and finally rinsed again with fresh acetone and dried in air at room temperature for 30 minutes. The film is cut into small strips and these are cold drawn to produce a 66% increase in length. The drawn film is strong and pliable.

EXAMPLE 2

To a solution of 1 part of lithium chloride in 20 parts of dimethylacetamide is added 0.6 parts of chitin (blue crab) and the mixture stirred at room temperature for one hour; then 10 parts of dimethylacetamide is added and the mixture stirred for two hours. The resulting solution is filtered through felt and the filtrate spread on a glass plate at a thickness of 1 mm. The chitin is regenerated into a film as in Example 1. The film is cut into small strips (2 mm×2.5 cm) and these are cold drawn 83%. The tensile strength of the drawn film is 16.1 Kg/mm².

The chitin films cast from solution in dimethylacetamide and dimethylacetamide/N-methylpyrrolidone systems show syneresis, i.e. solvent exudes from the film as it stands for a short time, e.g. for an hour. This has the effect of concentrating the chitin in the resident film and facilitating its renaturing by immersion in acetone.

EXAMPLE 3

To a solution of 2.5 parts LiCl in 50 parts N-methyl-2-pyrrolidone is added 0.25 parts chitin (Dungeness crab)

and the mixture is stirred at room temperature for 1.5 hours. The resulting solution is filtered through felt and the filtrate spread on a glass plate at a thickness of 1 mm. The chitin is regenerated into a film as in the previous examples. The film is cold drawable.

EXAMPLE 4

Five parts of finely divided chitin and 50 parts of dimethylacetamide containing 5% of lithium chloride is rapidly mixed at room temperature to thoroughly wet all of the chitin. At first the chitin appears to absorb the solvent to form discrete gel particles which upon standing and intermittent stirring convert to a very viscous mass. This mixture is worked periodically with a stirrer to promote gel particle attrition and develop a more coherent gelatinous system. After standing five days, the gelatinous material is doctored onto a platen and pressed to a coherent film. The solvent is removed by evaporation, followed by a water wash and drying. The resultant film is pliable and tough. The film can be cold drawn with typical necking down. Upon breaking at the extension limit, the fracture line shows fibrillation, as does polyethylene and other polymers capable of being cold drawn.

EXAMPLE 5

To 100 parts dimethylacetamide containing 5% lithium chloride 3.5 parts of chitin (red crab) is added and the mixture stirred for 18 hours. The resulting solution is filtered through felt and allowed to stand for 24 hours. Some of the solution is then spread on a glass plate to a thickness of 1 mm and regenerated as in example 1. The quality of film produced is tested by cold drawing and it is found to be capable of being cold drawn 40%. The remaining solution is stored for 48 days. It is noted that viscosity of the solution at the end of 48 days is the same as the fresh solution. Some of this solution that had been stored 48 days is then spread on a glass plate to a thickness of 1 mm and regenerated in the same manner as the film made from the fresh solution. The quality of this film is tested by cold drawing and it is found to be capable of being cold drawn 75%, thus indicating that storage in the solution does not degrade the chitin.

The following Examples, carried out with samples of chitin different from those described in Table 1, illustrate the conversion of the dextrorotatory form of chitin obtained by acid purification of chitin to the natural levorotatory form on storage of dimethylacetamide-lithium chloride solutions of the chitins at room temperature for several days.

EXAMPLE 6

To a solution of 100 parts of dimethylacetamide-5% lithium chloride one part of red crab chitin is added and the mixture stirred for one and a half hours. The solution is filtered through wool felt and then centrifuged for one hour at 2600 RPM. The optical activity of the sample is followed with time. Immediately following the centrifugation the optical activity, $[\alpha]_D^{25}$, of the sample $+65°$. After six days the optical activity changes to $0°$, and after 21 days in solution the optical activity stabilizes at $-22°$.

EXAMPLE 7

To a solution of 40 parts of dimethylacetamide-5% lithium chloride one part of pink shrimp chitin is added and the mixture stirred for one and a half hours. The solution is filtered through felt and then centrifuged for one hour at 2600 RPM. The optical activity of the chitin solution is observed over time. The initial optical activity, $[\alpha]_D^{25}$, is $+24°$ and after 21 days stabilizes at $-54°$.

While particular examples of the present invention have been shown and described it is apparent that changes and modification may be made therein without departing from the invention in its broader aspects. The aim of the appended claims, therefore, is to cover all such changes and modifications as fall within the true spirit and scope of the invention.

I claim:

1. A method of converting dextro rotatory chitin to levo rotatory chitin by dissolving chitin in dimethylacetamide or N-methylpyrrolidone or mixtures of these amides, in conjunction with about 2% of lithium chloride.

* * * * *